(12) United States Patent
Khawam

(10) Patent No.: US 10,939,072 B1
(45) Date of Patent: Mar. 2, 2021

(54) EVIDENCE COLLECTION AND ATTORNEY ENGAGEMENT METHOD AND SYSTEM

(71) Applicant: Natalie Khawam, Tampa, FL (US)

(72) Inventor: Natalie Khawam, Tampa, FL (US)

(*) Notice: Subject to any disclaimer, the term of this patent is extended or adjusted under 35 U.S.C. 154(b) by 0 days.

(21) Appl. No.: 16/994,197

(22) Filed: Aug. 14, 2020

Related U.S. Application Data

(60) Provisional application No. 62/888,189, filed on Aug. 16, 2019.

(51) Int. Cl.
*H04N 7/14* (2006.01)
*G06F 16/61* (2019.01)
*G06Q 20/14* (2012.01)
*G06Q 50/18* (2012.01)

(52) U.S. Cl.
CPC .............. *H04N 7/147* (2013.01); *G06F 16/61* (2019.01); *G06Q 20/145* (2013.01); *G06Q 50/18* (2013.01)

(58) Field of Classification Search
CPC .......... H04N 7/14; G06Q 50/18; G06Q 20/14; G06F 16/61
USPC ........................................... 348/14.01–14.16
See application file for complete search history.

(56) References Cited

U.S. PATENT DOCUMENTS

| | | | |
|---|---|---|---|
| 2007/0285506 A1* | 12/2007 | Schneider ............... | H04N 7/15 348/14.08 |
| 2016/0192166 A1* | 6/2016 | deCharms ............... | H04L 67/18 348/14.02 |
| 2017/0041516 A1* | 2/2017 | Oliveira ............. | H04N 5/23293 |
| 2017/0323574 A1* | 11/2017 | Bosko ..................... | H04L 67/06 |
| 2018/0025454 A1* | 1/2018 | Redmon ............... | H04W 4/025 705/311 |
| 2020/0186707 A1* | 6/2020 | Mallet .................... | H04N 7/188 |

* cited by examiner

*Primary Examiner* — Melur Ramakrishnaiah
(74) *Attorney, Agent, or Firm* — Tiffany C. Miller; Inventions International Inc.

(57) ABSTRACT

According to some embodiments, an evidence collection and attorney engagement method and system is disclosed. The method comprises receiving an attorney request from a requestor at a mobile device. The attorney request is then transmitted a plurality of attorneys and an acknowledgement is received from an available attorney. Next, a video conference is established between the available attorney and the requestor.

13 Claims, 4 Drawing Sheets

200

Receive an attorney request from a requester at a mobile device
202

Transmit the attorney request to a plurality of attorneys
204

Receive an acknowledgment from an available attorney
206

Establish a video conference between the available attorney and the requester
208

200

---

Receive an attorney request from a requester at a mobile device
202

---

Transmit the attorney request to a plurality of attorneys
204

---

Receive an acknowledgment from an available attorney
206

---

Establish a video conference between the available attorney and the requester
208

Receive an attorney request at a mobile device from a requester
302

Transmit a request for an available attorney to a back-end system
304

Receive an acknowledgment that an attorney is available
306

Establish a video conference between the available attorney and the requester
308

US 10,939,072 B1

EVIDENCE COLLECTION AND ATTORNEY ENGAGEMENT METHOD AND SYSTEM

BACKGROUND

Most police departments conduct traffic stops and a traffic stop (i.e., being pulled over) occurs when a driver of a vehicle is detained by police to investigate a possible crime or minor infraction. Police also frequently respond to numerous domestic violence situations. However, in these situations, most reported evidence comes from the police officer and not the people involved in the situation. Also, motorists or people involved in the domestic situation are often unaware of their legal rights. Therefore, a system that can collect evidence and engage an attorney immediately in the situation is desirable.

BRIEF DESCRIPTION OF THE DRAWINGS

FIG. 2 illustrates a process flow according to some embodiments.

DETAILED DESCRIPTION

Figure 1:
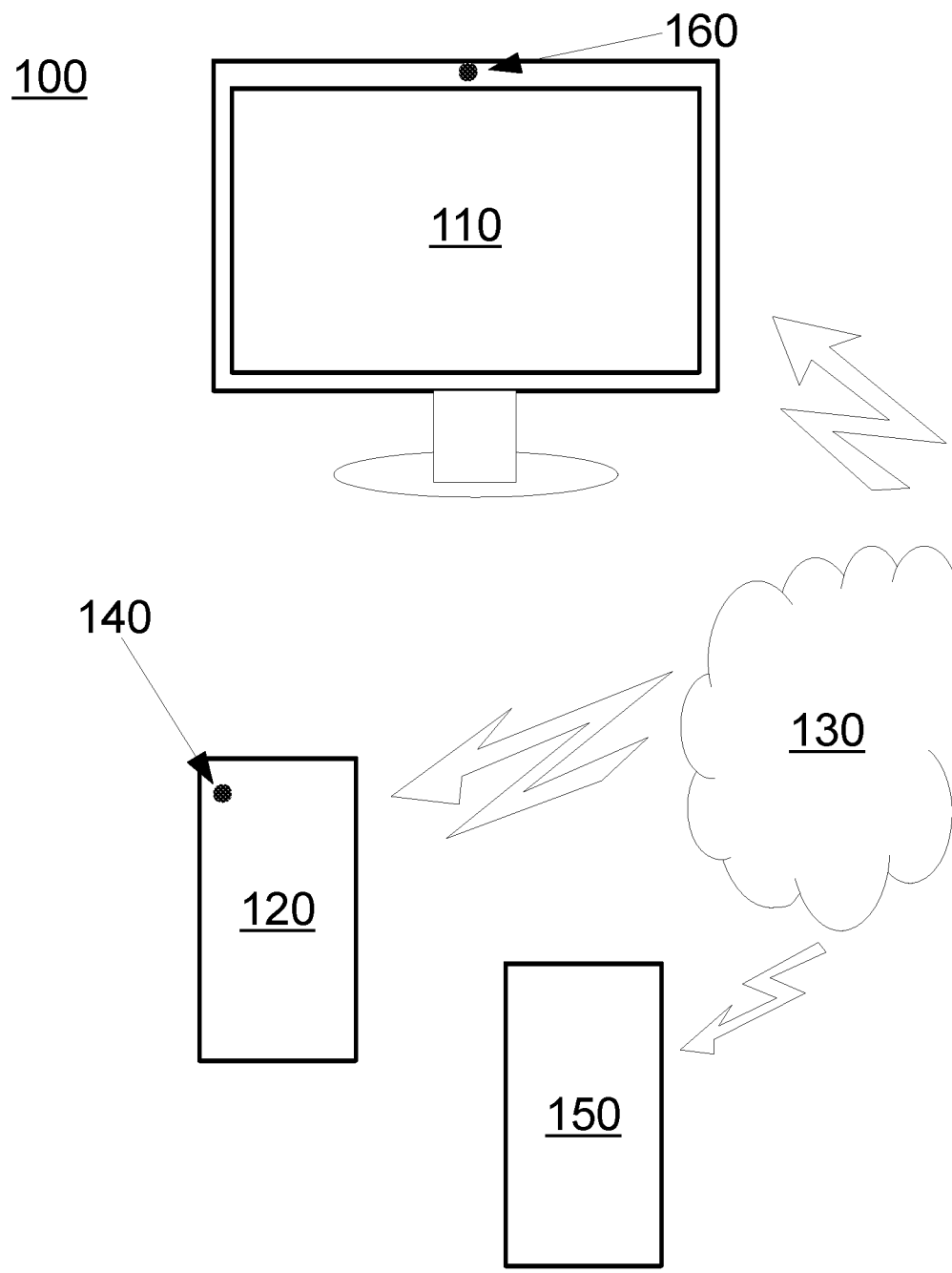
FIG. 1 illustrates a system according to some embodiments.

The present embodiments relate to a software application (e.g., a mobile application) to engage a lawyer in an emergency. A user, in an emergency (e.g., stopped by the police), can press an icon on their mobile device and they will establish a video connection with a lawyer so the lawyer can interface with both their client (e.g., the user) and the police. In essence the software application will allow a virtual lawyer to be at the traffic stop or home where an issue is occurring.

Since evidence is also important in criminal matters, sound and video may be captured by the mobile device and may be recorded/saved on a back-end system which may be later presented to a court as evidence. In some embodiments, sound and video will be stored locally on a device as well as uploaded to a back-end system.

Mobile devices typically comprise multiple cameras and the mobile application may turn on all cameras at once to record multiple views simultaneously. This may be recorded as a composite image stream or may be recorded as multiple separate image streams. For example, a front camera and a rear camera may be turned on simultaneously. In some embodiments, when a mobile device comprises multiple lenses (e.g., a zoom lens, a wide-angle lens and normal lens) each lens may be activated at once. In some embodiments, an image stream may rotate between multiple lens (e.g., a zoom lens, a wide-angle lens and normal lens).

In some embodiments, image and sound data may be buffered at the mobile device before being transmitted to the back-end system to save bandwidth for the live attorney (depending on the speed of the connection) or the image data may be recorded at the local device and then later uploaded when a better connection can be established. To ensure that image data is not tampered with, image data may be encoded and only decoded when it received at the back-end system. Therefore, the software application may first determine an amount of bandwidth needed for the attorney and then secondarily use any remaining bandwidth for transmitting evidence. Such a system may maximize bandwidth usage.

To use this system, a user must have already registered with a service provider and have a credit card (or other payment mechanism) on file so that when the lawyer is connected, the lawyer may automatically bill the client. The amount billed (e.g., the fee) may be based on an amount of time from start (starting the video conference) to end (hanging up) of the phone/app. In some embodiments, a voice only call may be used instead of a video conference. This may be particularly helpful if bandwidth is limited or too slow to handle a video call.

The present system may provide par-time or full-time work for lawyers. In some embodiments, a user may sign in to the system and call an attorney and the lawyer video conferences with you. The user may ask advice and the system may tape record the entire event so to use as defense or evidence. The present embodiments may also be good for emergency situations like getting pulled over or if you get arrested in an airport and don't know what to do, or how to find bail bondsman, or know other rights. The system may also be used by a user to learn how to patent an idea, or learn about their rights when you get sexually harassed at work or if you get in a car accident. Different grades of service may depend on a user's situation. This system may be good for mothers who are lawyers and can only work on a limited basis, young lawyers or public defenders who want to work part-time and can use the extra pay.

Lawyers using the system may not litigate a case that is generated and may just work on a front end as a creator of a case file, so that the case can be referred out when the emergency is over and needs to get covered. The company may then get a referral fee for each case.

Now referring to FIG. 1, an embodiment of an evidence collection and attorney engagement system 100 is illustrated. As illustrated in FIG. 1, a first computing device 110 and a second computing device 120 may be communicatively coupled to a communication network 130. The communication network 130 may comprise any wired or wireless communication network that may be used for communication purposes between electronic devices. For example, the network 130 may comprise, but is not limited to, a wired and/or wireless mesh network, LAN, MAN, WAN, or the Internet.

For purposes of illustration, the first computing device 110 may comprise, but is not limited to, a desktop computer, a laptop, a cell phone or a tablet. The first computing device 110 may function as a video communication system for an attorney. The second computing device 120 may comprise a mobile device such as a tablet or a smart phone. In some embodiments, the second computing device 120 may function as a client platform for a client in need of an attorney. The first computing device 110 and the second computing device 120 may communicate with a back-end or remote server 150 via the communication network 130 to transmit video and audio evidence and for video communication. As illustrated, the first computing device 110 may comprise one or more audio/video devices 160 that transmit audio/video information and the second computing device 120 may comprise one or more audio/video devices 140 that transmit audio/video information.

Now referring to FIG. 2, a method 200 that might be performed by the evidence collection and attorney engagement system 100 with respect to FIG. 1 is illustrated according to some embodiments. The method described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 200 may begin by receiving, from a requester, an attorney request at 202 at a mobile device. For example, a user that is pulled over by a police officer and wants to protect his rights, may execute an app on his phone. This mobile application may then (1) transmit, via a processor, a request for an attorney to engage in a video conference and (2) turn on cameras and/or microphones on the mobile device. At 204, the attorney request may be transmitted, via a processor, to a plurality of available attorneys. The available attorneys may be part time attorneys and they may be notified (e.g., on their mobile device or computer) that an attorney is needed. The available attorney may then accept the job and an acknowledgement from the attorney may be transmitted to the system. Once the available attorney accepts the job, a video conference between the available attorney and the requester at the mobile device may be established.

As the video conference is being conducted, the user's mobile device may begin capturing evidence such as, but not limited to, turning on one or more cameras and one or more microphones to begin capturing audio and video data. The evidence may be stored locally on the mobile device for later transmission or may be uploaded as it is captured (e.g., in real time or buffered). Based on a cellular, or WIFI connection, the mobile device may determine if it can send evidence during the video conference or if it should wait until the video conference is over before sending information to a back-end server. For example, if the user has a weak cellular signal, the mobile device may prioritize bandwidth for the video conference because the presence of the attorney may be more important than uploading evidence. In some embodiments, the mobile device may determine that it has more than adequate bandwidth for the video conferencing and may utilize a portion of its remaining bandwidth to upload evidence. In this case, a predetermined network speed may be used to determine if enough bandwidth exists (e.g., there is excess bandwidth) to upload evidence while a video conference is being held.

Figure 3:
FIG. 3 illustrates a process flow according to some embodiments.
Figure 3:
Figure 3:

Now referring to FIG. 3, a method 300 that might be performed by the evidence collection and attorney engagement system 100 described with respect to FIG. 1 is illustrated according to some embodiments. The method described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 300 may begin by receiving an attorney request at a mobile device from a requester at 302. For example, a user that is pulled over by a police officer and wants to protect his rights, may execute an app on his phone. This app may then (1) transmit a request for an attorney to engage in a video conference to a back-end system at 304 and also turn on cameras and/or microphones on the mobile device. At 306 an acknowledgement is received on the mobile device that an attorney is available. Next, a video conference is established between the available attorney and the requester at 308.

Note the embodiments described herein may be implemented using any number of different hardware configurations. For example, FIG. 4 illustrates a back-end server 400 that may be, for example, associated with the evidence collection and attorney engagement system 100 of FIG. 1.

Figure 4:
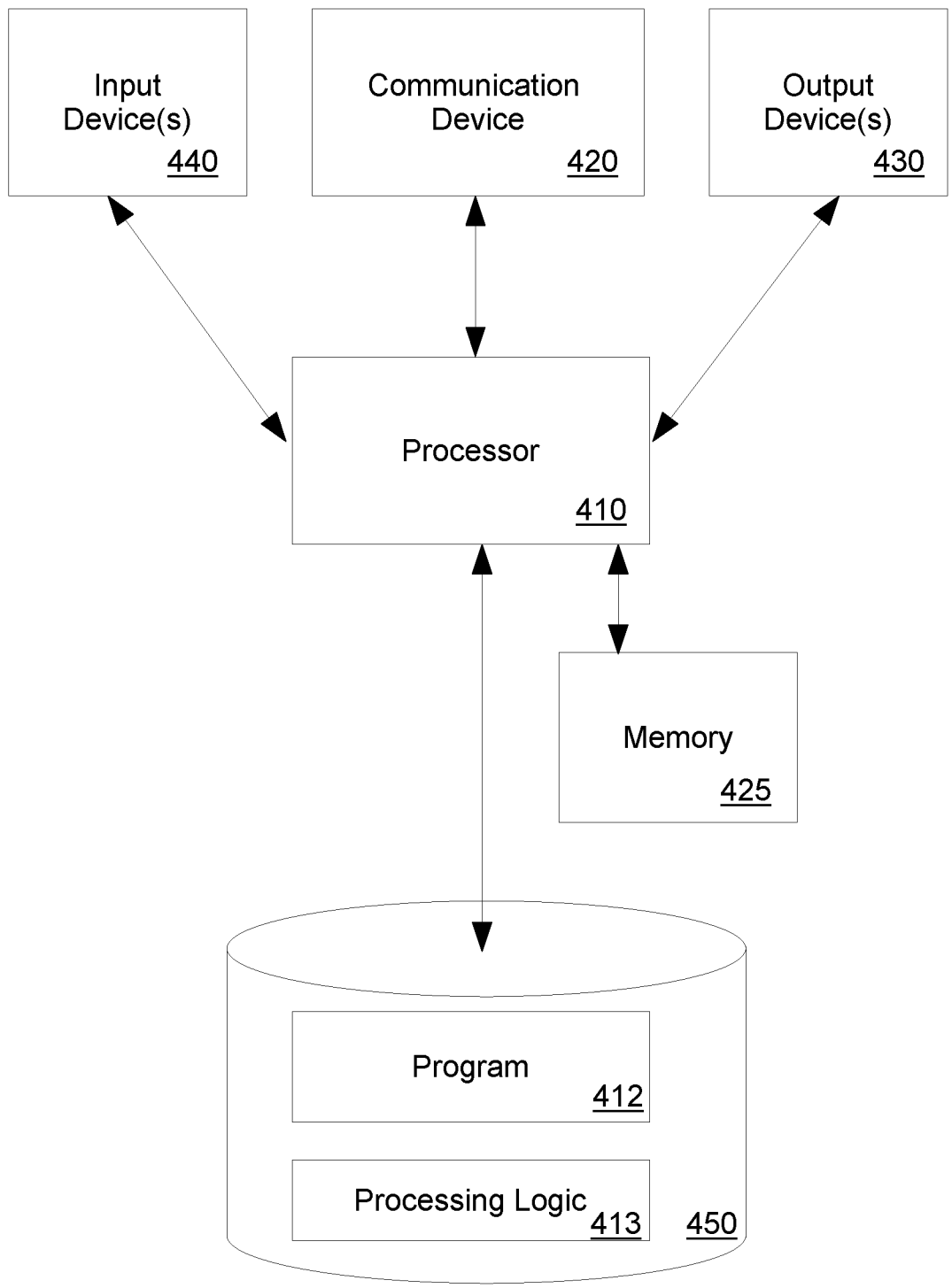
FIG. 4 illustrates an embodiment of a system.

The server 400 may comprise a processor 410 ("processor"), such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more machines on a network. The server 400 further includes an input device 440 (e.g., a mouse and/or keyboard) and an output device 430 (e.g., to output and display the data and/or alerts).

The processor 410 also communicates with a memory 425 and storage device 450 that stores data 413. The storage device 450 may comprise any appropriate information storage device, including combinations of magnetic storage devices (e.g., a hard disk drive), optical storage devices, mobile telephones, and/or semiconductor memory devices. The storage device 450 may store a program 412 and/or processing logic 413 for controlling the processor 410. The processor 410 performs instructions of the programs 412, 413, and thereby operates in accordance with any of the embodiments described herein. For example, the processor 410 may receive a request for an available attorney and may establish a video using the instructions of the programs 412 and processing logic 413.

The programs 412, 413 may be stored in a compiled, compressed, uncompiled and/or encrypted format or a combination. The programs 412, 413 may furthermore include other program elements, such as an operating system, a database management system, and/or device drivers used by the processor 410 to interface with peripheral devices.

As will be appreciated by one skilled in the art, the present embodiments may be embodied as a system, method or computer program product. Accordingly, the embodiments described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments described herein may take the form of a computer program product embodied in one or more computer readable medium(s) having computer readable program code embodied thereon.

The process flow and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. An evidence collection and attorney engagement method comprising:
    providing a first computing device and a second computing device, said second computing device having an application configured for a requester to request an attorney;
    transmitting, via a processor, the attorney request to said first computing device of an attorney;
    said second computing device of said requester receiving an acknowledgement from an available attorney;
    establishing a video conference between said available attorney at said second computing device and said requester at said first computing device;
    prioritizing bandwidth for said video conference by determining a required bandwidth for said video conference;
    determining an excess bandwidth by comparing a predetermined network speed with said required bandwidth for said video conference; and,
    transmitting evidence during said video conference using said excess bandwidth.

2. The evidence collection and attorney engagement method of claim 1, further comprising:
    receiving video evidence from the requestor during the established video conference from a camera.

3. The evidence collection and attorney engagement method of claim 1, further comprising:
    receiving audio evidence from the requestor during the established video conference from one or more microphones.

4. The evidence collection and attorney engagement method of claim 1, further comprising:
    determining a fee to charge the requester based on a determined time of the video conference.

5. A non-transitory computer-readable medium comprising processor steps that when executed by a processor perform a method, the method comprising:
    receiving an attorney request from a requester at an electronic device;
    transmitting, via a processor, a request to an attorney;
    receiving an acknowledgement from an available attorney;
    establishing a video conference between the available attorney and the requester at said electronic device;
    prioritizing bandwidth for said video conference by determining a required bandwidth for said video conference;
    determining an excess bandwidth by comparing a predetermined network speed with said required bandwidth for said video conference; and,
    transmitting evidence during said video conference using said excess bandwidth.

6. The non-transitory computer-readable medium of claim 5, further comprising:
    receiving video evidence from the requestor during the established video conference from a plurality of cameras.

7. The non-transitory computer-readable medium of claim 5, further comprising:
    receiving audio evidence from the requestor during the established video conference from one or more microphones.

8. The non-transitory computer-readable medium of claim 5, further comprising:
    determining a fee to charge the requester based on a determined time of the video conference.

9. A non-transitory computer-readable medium comprising processor steps that when executed by a processor perform a method, the method comprising:
    receiving an attorney request at a mobile device from a requester;
    transmitting, via a processor, a request for an available attorney to a back-end system;
    receiving an acknowledgement that an attorney is available;
    establishing a video conference between the available attorney and the requester;
    prioritizing bandwidth for said video conference by determining a required bandwidth for said video conference;
    determining an excess bandwidth by comparing a predetermined network speed with said required bandwidth for said video conference; and,
    transmitting evidence during said video conference using said excess bandwidth.

10. The non-transitory computer-readable medium of claim 9, further comprising:
    transmitting video evidence to the back-end system from a plurality of cameras.

11. The non-transitory computer-readable medium of claim 9, further comprising:
    transmitting audio evidence to the back-end system from one or more microphones.

12. The non-transitory computer-readable medium of claim 9, wherein the evidence is transmitted in an image stream comprising video rotated between multiple camera lenses.

13. The non-transitory computer-readable medium of claim 9, wherein the multiple camera lenses comprise a zoom lens, a wide-angle lens and a normal lens.

* * * * *